United States Patent
Eager

(10) Patent No.: US 9,523,974 B2
(45) Date of Patent: Dec. 20, 2016

(54) METHOD OF CONTROLLING OPERATION OF AN EXHAUST FLUID TREATMENT APPARATUS

(71) Applicant: Perkins Engines Company Limited, Peterborough, Cambridgeshire (GB)

(72) Inventor: Antony Eager, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 0 days.

(21) Appl. No.: 14/415,910

(22) PCT Filed: Jul. 24, 2013

(86) PCT No.: PCT/GB2013/051977
§ 371 (c)(1),
(2) Date: Jan. 20, 2015

(87) PCT Pub. No.: WO2014/016594
PCT Pub. Date: Jan. 30, 2014

(65) Prior Publication Data
US 2015/0185722 A1    Jul. 2, 2015

(30) Foreign Application Priority Data

Jul. 27, 2012  (GB) .................................. 1213461.5

(51) Int. Cl.
*F01N 3/00* (2006.01)
*G05B 15/02* (2006.01)
(Continued)

(52) U.S. Cl.
CPC ............. *G05B 15/02* (2013.01); *B01D 53/944* (2013.01); *B01D 53/9495* (2013.01);
(Continued)

(58) Field of Classification Search
USPC ................. 60/274, 286, 297, 299, 301, 303
See application file for complete search history.

(56) References Cited

U.S. PATENT DOCUMENTS 8,056,323 B2 * 11/2011 Oosumi ................. B01D 53/90
  60/274
8,215,098 B2 * 7/2012 Wang .................... F01N 3/0821
  60/276

(Continued)

FOREIGN PATENT DOCUMENTS

| CN | 101316993 | 12/2008 |
| CN | 101466925 | 6/2009 |
| CN | 102016252 | 4/2011 |

OTHER PUBLICATIONS

European Patent Office, International Search Report in International Patent Application No. PCT/GB2013/051977, Jul. 11, 2013, 3 pp.

(Continued)

*Primary Examiner* — Binh Q Tran

(57) ABSTRACT

An exhaust flow treatment apparatus to treat exhaust flow emitted by a combustion engine is configured to receive unburnt fuel for combustion therein after confirming that conditions are such that the unburnt fuel is likely to combust in the apparatus. A method of controlling operation of an exhaust flow treatment apparatus includes confirming that the temperature of fluid in the apparatus exceeds a threshold temperature before allowing unburnt fuel into the apparatus. The method may confirm a particular mode of operation of the exhaust flow treatment apparatus to determine the appropriate quantity of fuel for burning in the apparatus.

18 Claims, 4 Drawing Sheets

(51) Int. Cl.

| | | |
|---|---|---|
| *F01N 3/10* | (2006.01) | |
| *F01N 3/20* | (2006.01) | |
| *F01N 9/00* | (2006.01) | |
| *F02D 41/02* | (2006.01) | |
| *F02D 41/14* | (2006.01) | |
| *F01N 13/00* | (2010.01) | |
| *B01D 53/94* | (2006.01) | |
| *F02D 41/30* | (2006.01) | |
| *F01N 3/025* | (2006.01) | |
| *F02D 41/40* | (2006.01) | |

(52) U.S. Cl.
CPC ............ *F01N 3/103* (2013.01); *F01N 3/106* (2013.01); *F01N 3/20* (2013.01); *F01N 3/2006* (2013.01); *F01N 3/2033* (2013.01); *F01N 9/005* (2013.01); *F01N 13/009* (2014.06); *F01N 13/0097* (2014.06); *F02D 41/025* (2013.01); *F02D 41/1445* (2013.01); *F02D 41/1446* (2013.01); *F02D 41/30* (2013.01); *F01N 3/0253* (2013.01); *F01N 3/2066* (2013.01); *F01N 2430/085* (2013.01); *F01N 2560/06* (2013.01); *F01N 2560/07* (2013.01); *F01N 2560/08* (2013.01); *F01N 2560/14* (2013.01); *F01N 2900/0412* (2013.01); *F01N 2900/0601* (2013.01); *F01N 2900/1404* (2013.01); *F01N 2900/1406* (2013.01); *F01N 2900/1411* (2013.01); *F02D 41/1448* (2013.01); *F02D 41/405* (2013.01); *Y02T 10/26* (2013.01); *Y02T 10/47* (2013.01)

(56) References Cited

U.S. PATENT DOCUMENTS

| | | | |
|---|---|---|---|
| 8,353,151 B2* | 1/2013 | Tsujimoto | F01N 3/025 60/286 |
| 8,534,050 B2* | 9/2013 | Yanakiev | F01N 13/009 60/284 |
| 8,640,448 B2* | 2/2014 | Geveci | F01N 3/208 60/274 |
| 8,713,914 B2* | 5/2014 | Schmieg | F01N 13/0093 60/274 |
| 2008/0104945 A1 | 5/2008 | Ruth et al. | |
| 2009/0266058 A1 | 10/2009 | Kesse et al. | |
| 2010/0313551 A1 | 12/2010 | Johnson et al. | |
| 2011/0257899 A1 | 10/2011 | Zanetti et al. | |
| 2011/0271656 A1 | 11/2011 | Tan et al. | |

OTHER PUBLICATIONS

United Kingdom Intellectual Property Office, Search Report in United Kingdom Patent Application No. GB1213461.5, Nov. 26, 2012, 1 p.

* cited by examiner

METHOD OF CONTROLLING OPERATION OF AN EXHAUST FLUID TREATMENT APPARATUS

TECHNICAL FIELD

The disclosure relates to the field of exhaust fluid treatment and, in particular, to controlling operation of an exhaust fluid treatment apparatus having a diesel oxidation catalyst.

BACKGROUND

An exhaust fluid treatment apparatus may comprise a plurality of modules, wherein each module is intended to treat one or more constituents of an exhaust fluid. The modules may be arranged in series such that exhaust fluid flows through each module in sequence. In order to operate as intended, some modules may require the exhaust fluid to exceed a particular temperature.

An exhaust fluid treatment apparatus may comprise a diesel oxidation catalyst module and a selective catalytic reduction module, downstream of the diesel oxidation catalyst module. The selective catalytic reduction module may not operate as intended when the exhaust fluid is below a certain temperature. In order to increase the temperature of the exhaust fluid in the selective catalytic reduction module, it may be appropriate to use the diesel oxidation catalyst module to increase the temperature of the exhaust fluid passing through it in order to increase the temperature of exhaust fluid arriving at the selective catalytic reduction module. This may be achieved by introducing unburnt fuel upstream of the diesel oxidation catalyst for oxidation in the diesel oxidation catalyst thereby to increase the temperature of the exhaust fluid leaving the diesel oxidation catalyst module. However, it may be necessary to avoid injecting unburnt fuel into the diesel oxidation catalyst module if the temperature of the diesel oxidation catalyst module is too low to result in combustion of the fuel since otherwise the unburnt fuel may simply pass out of the diesel oxidation catalyst module and may thereby cause damage to subsequent features of the exhaust fluid treatment apparatus and/or pass directly to atmosphere.

Against this background there is provided a method of controlling operation of an exhaust fluid treatment apparatus.

SUMMARY OF THE DISCLOSURE

A method of controlling operation of an exhaust fluid treatment apparatus, wherein the apparatus comprises a diesel oxidation catalyst comprising an inlet and an outlet, the method may comprise:
  receiving an input temperature data value being indicative of a temperature at the inlet;
  receiving a flow rate data value being indicative of a rate of flow of fluid in the diesel oxidation catalyst;
  receiving a threshold temperature data value indicative of a predicted temperature required for fuel in the diesel oxidation catalyst to oxidise;
  receiving mode data indicative of whether the diesel oxidation catalyst is operating in a first mode or a second mode; and
  sending, when the input temperature data value is greater than the threshold temperature data value, a fuel data value indicative of a quantity of fuel to be injected into the exhaust fluid upstream of the inlet for combustion in the diesel oxidation catalyst,
  wherein the fuel data value is obtained from a data library which comprises a first set of fuel data values relating to the first mode and a second set of fuel data values relating to the second mode, each fuel data value of the first and second sets of fuel data values being associated with a particular combination of input temperature data value and flow rate data value.

DETAILED DESCRIPTION

Before describing the specifics of an embodiment of the method of the disclosure, the following is an explanation of the features and broad operation of an exhaust fluid treatment apparatus to which the method of the disclosure might be applied.

Figure 1:
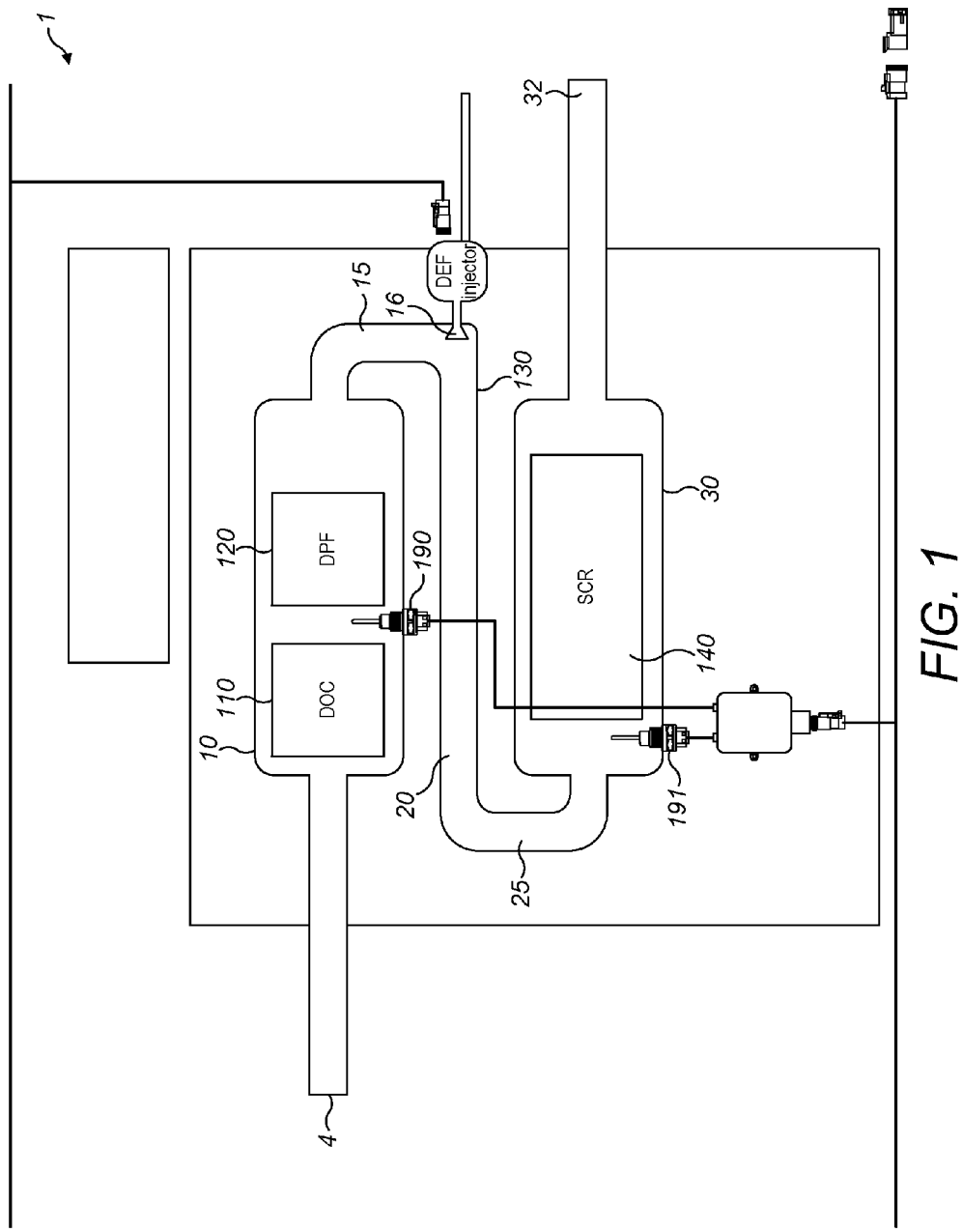
FIG. 1 shows a schematic drawing of an embodiment of an exhaust fluid treatment apparatus to which the method may be applied.
Figure 2:
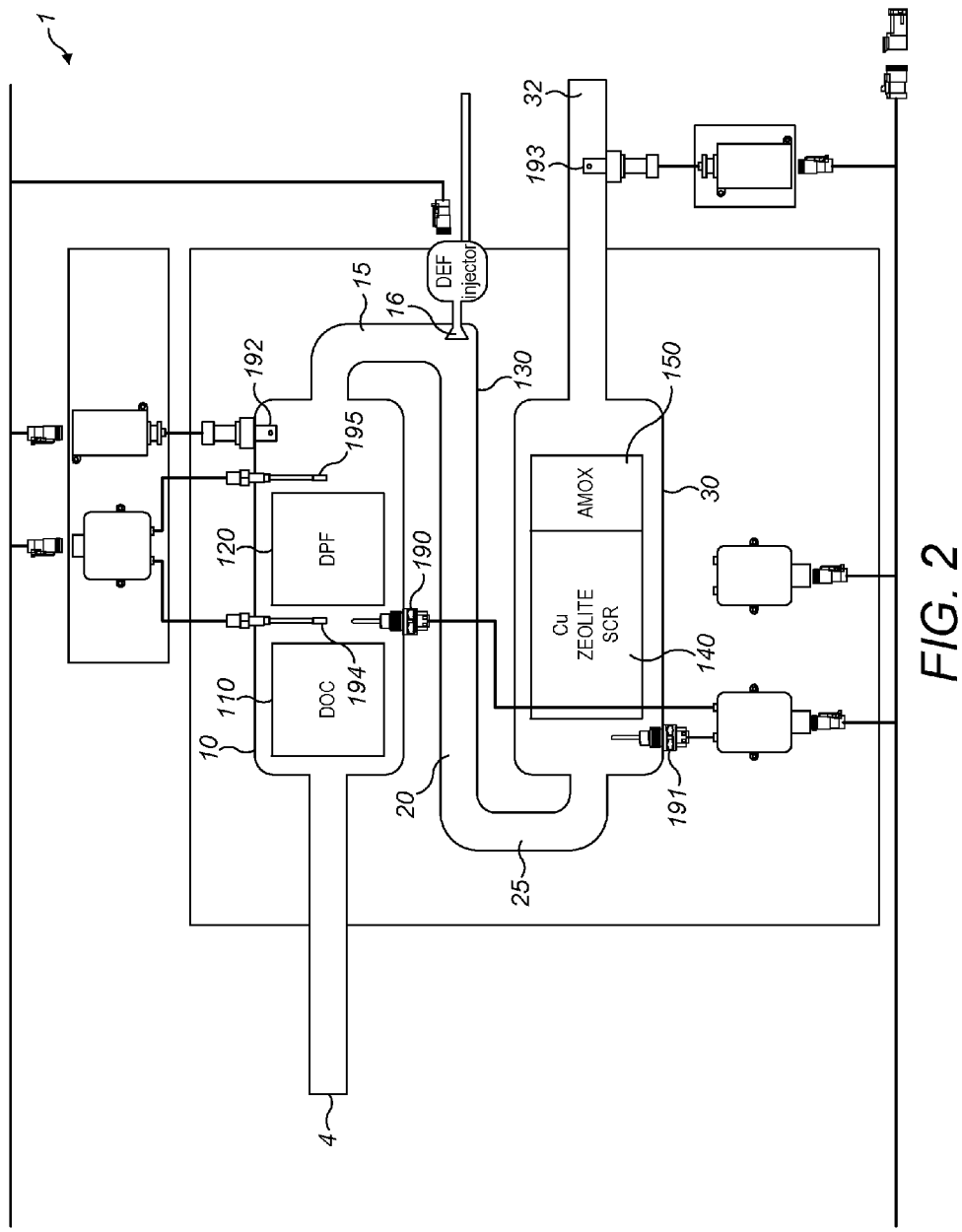
FIG. 2 shows a more detailed schematic drawing of an embodiment of an exhaust fluid treatment apparatus to which the method may be applied.
Figure 3:
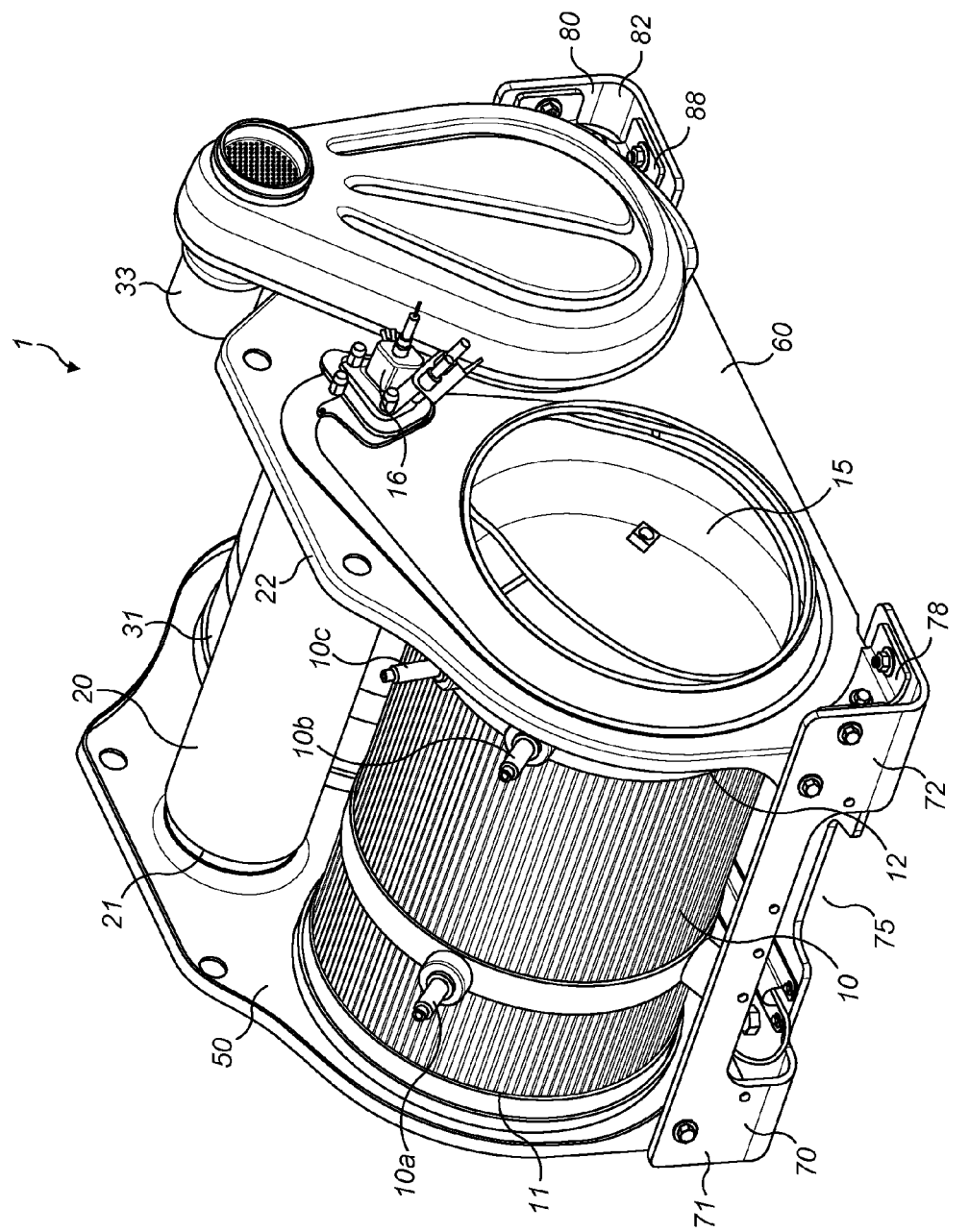
FIG. 3 shows a schematic drawing of an external appearance of the embodiment of FIG. 2.

Referring first to FIGS. 1 to 3, there is illustrated an embodiment of an exhaust fluid treatment apparatus 1. The apparatus 1 may comprise a fluid flow path through which fluid may flow sequentially through various conduits, such as a first conduit 10, a first end coupling 15, a second conduit 20, a second end coupling 25, and a third conduit 30. The first, second and third conduits 10, 20, 30 may be substantially mutually parallel.

The fluid flow path comprises, in series, a diesel oxidation catalyst (DOC) module 110, a diesel particulate filter (DPF) module 120, a mixer module 130, a selective catalytic reduction (SCR) module 140 and/or an ammonia oxidation catalyst (AMOX) module 150.

In use, fluid may be supplied to the exhaust fluid treatment apparatus 1 via the inlet 4. Fluid may pass into the DOC module 110 in the first portion of the first conduit 10. Prior to receipt at the inlet 4, the pressure of the exhaust fluid may be controlled by a back pressure valve (not shown).

The DOC module 110 may comprise one or more catalysts, such as palladium or platinum. These materials serve as catalysts to cause oxidation of hydrocarbons ([HC]) and carbon monoxide (CO) present in the fluid flow in order to produce carbon dioxide ($CO_2$) and water ($H_2O$). The DOC may also serve to convert NO to $NO_2$ so as to achieve a $NO:NO_2$ ratio of 1:1. The catalysts may be distributed in a manner so as to maximise the surface area of catalyst material in order to increase effectiveness of the catalyst in catalysing reactions.

Fluid may flow from the DOC module 110 to the DPF module 120 which comprises features which are intended to restrictonward passage of carbon (C) in the form of soot. Carbon particles in the fluid may thus be trapped in the filter. The DPF module 120 may be regenerated through known regeneration techniques. These techniques may involve controlling one or more of the temperature of the fluid, the pressure of the fluid and the proportion of unburnt fuel in the fluid at this point in the apparatus.

Exhaust fluid may pass from the DPF module 120 into the first end coupling 15 where it flows past the injector module 16. The injector module 16 may be associated with or attachable to a pump electronic tank unit (PETU). The pump electronic tank unit may comprise a tank for providing a reservoir for emissions fluid to be injected by the injector. Such emissions fluids may include urea or ammonia.

The PETU may further comprise a controller configured to control a volume of emissions fluid to be injected from the tank by the injector. The controller may have as inputs, for example, temperature information and quantity of $NO_x$ information which may be derived from sensors in the SCR module 140.

Emissions fluid may pass from the injector module 16 into the mixer module (not shown) located in the second conduit 20. The mixer module may comprise features for ensuring that the exhaust fluid originating from the first conduit 10 is well mixed with the emissions fluid originating from the injector 16, to create a mixed fluid.

The mixed fluid from the second conduit 20 may pass into the SCR module located in the first portion of the third conduit via the second end coupling 25. The SCR module 140 may comprise one or more catalysts through which the mixed fluid may flow. As the mixed fluid passes over the surfaces of the catalyst a reaction may occur which converts the ammonia and $NO_x$ to diatomic nitrogen ($N_2$) and water ($H_2O$).

Fluid may pass from the SCR module 140 to the AMOX module 150 located in the second portion of the third conduit 30. The AMOX module 150 may comprise an oxidation catalyst which may cause residual ammonia present in the fluid exiting the SCR module to react to produce nitrogen ($N_2$) and water ($H_2O$).

Fluid may pass from the AMOX module 150 to the exhaust fluid treatment apparatus outlet located at the second end 32 of the third conduit 30.

As shown in FIG. 2, the exhaust fluid treatment apparatus 1 may comprise sensors for detecting characteristics of the fluids at particular stages in their flow through the exhaust fluid treatment apparatus 1. There may be a first temperature sensor (not shown) upstream of the DOC 110, a second temperature sensor 190 between the DOC 110 and the DPF 120 and/or a third temperature sensor 191 between the mixer module 130 and the SCR 140. There may be a first $NO_x$ sensor 192 between the DPF module 120 and the injector 16 and there may be a second $NO_x$ sensor 193 downstream of the AMOX module 150. There may also be a first soot sensor 194 immediately upstream of the DPF 120 and possibly a second soot sensor 195 immediately downstream of the DPF 120.

Having described the features and broad operation of the exhaust fluid treatment apparatus, the method of the present disclosure will now be described.

Figure 4:
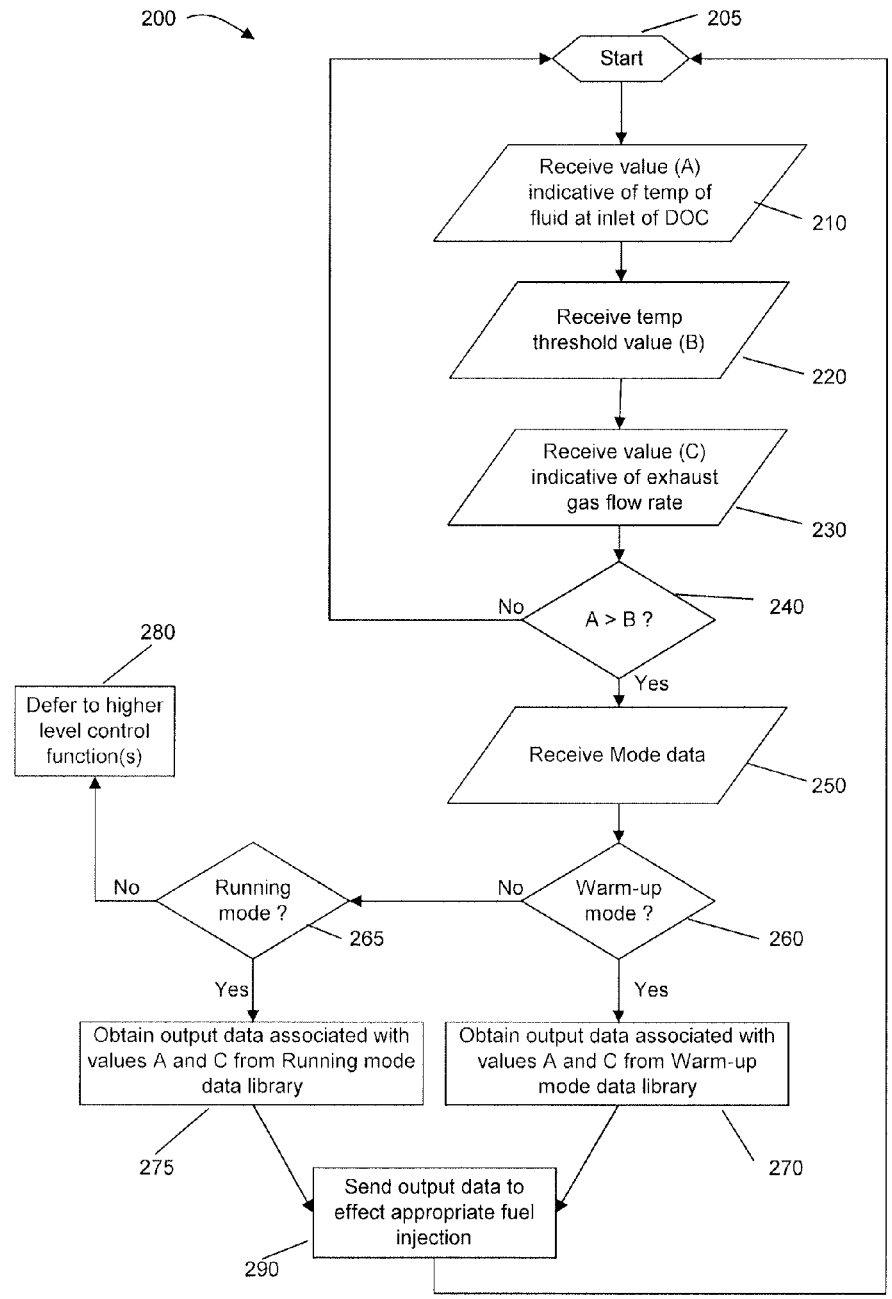
FIG. 4 shows a flow chart which illustrates an embodiment of the method of the disclosure.

Referring to FIG. 4, there is illustrated a flow chart 200 showing an embodiment of the method of the disclosure.

The method may involve receiving data relating to three parameters. A first data value 210 may be indicative of a temperature of gas flowing into the DOC module 110. A second data value 220 may be indicative of a threshold temperature at which fuel is likely to combust in the DOC module 110. A third data value 230 may be indicative of a rate of flow of fluid in the DOC module 110.

In use, exhaust fluid from an engine may be received into an inlet of the exhaust fluid treatment apparatus for onward travel to the DOC 110. The exhaust fluid has a temperature at the point where it is received into the DOC 110. The temperature of the gas at the point where it is received into the DOC 110 may not be directly measurable due to location of temperature sensors. That is, there may not be a temperature sensor immediately prior to the inlet of the DOC 110. The method may therefore involve receiving temperature information at a point upstream of the DOC 110 and accounting, perhaps by predictive models or similar, for likely changes in temperature between the upstream point and the inlet to the DOC 110. Whether directly measured or not, the first data value 210 is indicative of a temperature of gas flowing into the DOC module 110.

The second data value 220 may be indicative of a threshold temperature at which fuel is likely to combust in the DOC 110. This may or may not be dependent on operating conditions.

The third data value 230 may be indicative of the rate of flow of fluid in the DOC module 110. More specifically, this may be indicative of the mass flow (kg/h) of fluid through the DOC or may be indicative of space velocity ($s^{-1}$) of fluid in the DOC. The third data value 230 might be predicted based on measurements of fluid flow taken upstream or downstream of the DOC module, depending on location of appropriate sensors.

For example, the flow rate data value indicative of the rate of flow of fluid in the DOC might be obtained by a mass fluid flow sensor located in the fluid flow path adjacent (i.e. upstream or downstream of) the DOC. However, continuous likely variation in fluid temperature and a range of constituent products in the exhaust fluid may result in such sensors becoming damaged and/or unreliable.

Alternatively, the flow rate data value indicative of the rate of flow of fluid in the DOC might be obtained using a model in combination with a mass fluid flow sensor located at a gas (air) intake of the engine to which the DOC is attached. The model may take into account the flow of gas (air) into the engine, the volume of fuel injected into the engine, any potential exhaust gas recirculation and any other relevant parameters in order to estimate the rate of flow of fluid in the DOC.

Instead of or in addition to one or more mass fluid flow sensors, there may be provided a combination of temperature and pressure sensors from which rate of flow of fluid can be calculated, either in real time or by reference to a model, look-up table or similar. For example, by measuring temperature and pressure of gas (air) intake and of exhaust gas adjacent or within the DOC, mass fluid flow through the DOC may be estimated. Such an estimate may involve a model, look-up table or similar.

A mass flow value (kg/h) may be used, in combination with parameters relating to geometry of the DOC and other features of the apparatus, to estimate space velocity ($s^{-1}$) of fluid in the DOC.

An engine control unit may collect some or all of these data for the present purpose and/or for other purposes. Models and/or look up table for the present purpose and/or for other purposes may be present in the engine control unit.

The method may comprise assessing 240 whether the first data value 210 is greater than the second data value 220. In the event that the first data value 210 (indicative of the temperature of fluid flowing into the DOC 110) is lower than the second data value 220 (indicative of the minimum temperature for ignition of fuel in the DOC 110), the method may involve no injection of unburnt fuel to be received into the DOC since this may result in the unburnt fuel passing through the DOC 110 without oxidising. Rather, the method may loop back to the start 205, perhaps with a delay before receiving new sets of data 210, 220, 230. In the event that the first data value 210 is higher than the second data value 220 this may result in obtaining mode data 250 in order to determine an appropriate quantity of unburnt fuel to be released upstream of the DOC 110 for burning in the DOC.

In the event that the first data value 210 is higher than the second data value 220, the method may involve making a check 260, 265 of whether the conditions are indicative of a first mode or a second mode. As shown in the specific embodiment of FIG. 4, the first mode may be a warm-up mode and the second mode may be a running mode. While FIG. 4 may imply that the checks are carried out sequentially (beginning with checking for warm-up mode and, if negative, checking for running mode), the sequence may be reversed or the checks may be carried out concurrently.

If neither the first nor the second mode is applicable, higher level control functions 280 may be used to determine next steps for control of the exhaust fluid treatment apparatus 1.

If the first mode is applicable, the method may comprise consulting a data library for first mode fuel data associated with the input value obtained at step 210 and the input value obtained at step 230.

If the second mode is applicable, the method may comprise consulting a data library for second mode fuel data associated with the input value obtained at step 210 and the input value obtained at step 230.

The fuel data value 270, 275 may be indicative of a quantity of fuel, or a rate of flow of fuel, to be injected into the fluid upstream of the inlet to the DOC 110. The fuel may be injected immediately prior to the inlet to the DOC 110. Alternatively, the fuel may be injected into one or more cylinders of the engine (in addition to fuel injected into one or more cylinders for combustion in those one or more cylinders, but at a different point in a stroke of the engine) such that the additionally injected fuel is intended not to combust in the engine cylinders but to pass through to the exhaust fluid treatment apparatus 1 for oxidation in the DOC 110. For example, the injection of the fuel to be injected into the cylinder may occur when an exhaust valve of the cylinder is open.

The first mode fuel data value 270 may be different from the second mode fuel data value 275 since the appropriate amount of fuel to be injected may be different depending on the operating conditions of the engine. The values may be considerably different when the DOC is warming-up compared with when the DOC is running having already warmed-up.

In the FIG. 4 example, the first mode fuel data values may be used when the DOC is warming-up and the second mode fuel data values may be used when the DOC has already warmed-up and is in a normal running mode. An exhaust gas temperature may be lower during DOC warm-up than during normal running mode. Consequently, during warm-up there may be an increased risk that fuel intended for combustion in the DOC may not combust in the DOC due to the temperature being too low. Consequently, unburnt fuel may pass out of the exhaust fluid treatment apparatus altogether, which may be inefficient and undesirable for regulatory reasons. Therefore, the amount of unburnt fuel to be passed into the DOC for combustion therein may need to be limited to a lower quantity when the DOC is warming-up than when the DOC is already warmed-up. Limitation of the amount of fuel may be achieved in the warm-up mode by consulting an entirely independent data library than that used in the normal running mode. Alternatively, the limitation required in the warm-up mode may be achieved by obtaining corresponding data relating to the normal running mode but placing a limit on that data. The limit may be an absolute limit on the quantity of unburnt fuel to be injected for combustion in the DOC. Alternatively, the limit may act to restrict the rate of increase of injection of unburnt fuel for combustion in the DOC.

While the term data library is used in this disclosure, the data may be stored in any suitable facility for the storage of data such as a look up table. Alternatively, or in addition, there may be some element of calculation of the fuel data values, such as, for example, where the second mode fuel data values are obtained from the first mode fuel data values by a calculation according to some functional relationship. Such a relationship may be intended to limit the rate of increase of flow of fuel during DOC warm-up. In other words, in this example, the calculation may simply serve to limit the rate of injection of fuel until such time as the temperature of the fluid in the DOC is sufficient to ensure that the fuel will burn in the DOC rather than pass through the DOC without combusting. In a further example, calculation of first or second mode fuel data values may be appropriate where an actual measured input value is part way between two input values for which fuel data values are provided in the data library. In this case, the method might involve interpolation or some other form of calculation to determine the appropriate fuel data value.

There may be a variety of reasons why and circumstances in which it may be desirable to inject into engine cylinders fuel which is intended to pass through the cylinders unburnt. One example may be a desire to achieve desulphation of an SCR module located downstream of the DOC as part of a SCR desulphation procedure. Such a desulphation procedure may require an increased temperature in the SCR in order that sulphur combusts. The increased temperature in the SCR may be achieved by injecting unburnt fuel into the DOC (upstream of the SCR) for burning in the DOC and thereby increasing a temperature of the fluid arriving at the SCR. Such a procedure may take place intermittently and might occur only when a need for such a procedure has been identified as part of overall engine control. The method of the present invention may be used as part of this procedure.

While this disclosure does not recite one or more specific fuel data values for use with specific combinations of input value (i.e. data library values), nevertheless, the specific fuel data values may be intended (a) to minimise any delay before which fluid in the SCR 140 rises to a temperature above which the SCR 140 operates as intended by burning fuel in the DOC 110 upstream of the SCR 140 and (b) to minimise the possibility of unburnt fuel travelling through the DOC 110 without oxidising since this may result in reduction in efficiency of the DPF 120 or the SCR 140 and/or may result in unburnt fuel being released to atmosphere. Put another way, the quantity of additional fuel introduced upstream of the DOC 110 (the quantity being determined by the fuel data value) may be sufficient to result in the desired temperature increase in the DOC 110 but not so high as to result in unburnt fuel slipping through the DOC 110. The quantity of fuel may be different depending on whether the DOC is operating in the warm-up mode or the running mode.

The method of the disclosure may not eliminate altogether the possibility of unburnt fuel passing through the DOC. There may be circumstances in which fuel volumes are selected such as to maintain below an acceptable threshold the volume of fuel likely to pass through the DOC unburnt.

The method may be applied periodically, perhaps as part of an in-use procedure or as part of a dedicated service procedure, in order to increase the temperature of exhaust fluid in the exhaust fluid treatment apparatus. The fuel may be burnt either with the intention of increasing the temperature of exhaust fluid leaving one module of the exhaust fluid treatment apparatus such that the temperature of exhaust fluid entering a subsequent module of the exhaust fluid treatment apparatus. Alternatively, it may be burnt with the intention of combusting particles which may have become trapped on filtering elements of the module in which the fuel is burnt.

There may be a variety of reasons why and circumstances in which it may be desirable to inject into engine cylinders fuel which is intended to pass through the cylinders unburnt. One example may be a desire to achieve desulphation of an SCR module located downstream of the DOC as part of a SCR desulphation procedure. Such a desulphation procedure may require an increased temperature in the SCR in order that sulphur combusts. The increased temperature in the SCR may be achieved by injecting unburnt fuel into the DOC (upstream of the SCR) for burning in the DOC and thereby increasing a temperature of the fluid arriving at the SCR. Such a procedure may take place intermittently and might occur only when a need for such a procedure has been identified as part of overall engine control. The method of the present invention may be used as part of this procedure.

The terms exhaust gas and exhaust fluid may be used interchangeably. The exhaust gas/fluid may include solid particles such as particles of soot which, while in the solid phase, may be understood to be a constituent of exhaust gas/fluid.

The invention claimed is:

1. A method of controlling operation of an exhaust fluid treatment apparatus, the apparatus comprising a diesel oxidation catalyst comprising an inlet and an outlet, the method comprising:
   receiving an input temperature data value being indicative of a temperature at the inlet;
   receiving a flow rate data value being indicative of a rate of flow of fluid in the diesel oxidation catalyst;
   receiving a threshold temperature data value indicative of a predicted temperature required for fuel in the diesel oxidation catalyst to oxidize;
   receiving mode data indicative of whether the diesel oxidation catalyst is operating in a first mode or a second mode, the first mode being a warm-up mode and the second mode being a running mode of the diesel oxidation catalyst; and
   sending, when the input temperature data value is greater than the threshold temperature data value, a fuel data value indicative of a quantity of fuel to be injected into the exhaust fluid upstream of the inlet for combustion in the diesel oxidation catalyst,
   wherein the fuel data value is obtained from a data library which comprises a first set of fuel data values relating to the first mode and a second set of fuel data values relating to the second mode, each fuel data value of the first and second sets of fuel data values being associated with a particular combination of input temperature data value and flow rate data value, and for each particular combination of input temperature data value and flow rate data value, a data value of the first set of data values is indicative of a smaller quantity of fuel or a slower rate of flow of fuel than a data value of the second set of data values.

2. The method of claim 1 wherein the input temperature data value indicative of a temperature at the inlet is obtained by receiving a temperature measurement upstream of the inlet and using a compensation factor to account for a likely change temperature change between the temperature measurement and the actual temperature at the inlet of the diesel oxidation catalyst.

3. The method of claim 1 wherein the flow rate data value is indicative of mass flow of exhaust or space velocity.

4. The method of claim 1 wherein the flow rate data value is obtained by a measurement in combination with a prediction.

5. The method of claim 1 wherein the step of receiving the flow rate data value comprises receiving an upstream pressure value of fluid upstream of the DOC, and receiving a downstream temperature value and a downstream pressure value of fluid downstream of the DOC, then consulting a look up table to identify an estimate of the flow rate data corresponding to the received upstream temperature value, the received upstream pressure value, the received downstream temperature value and the received downstream pressure value.

6. The method of claim 1 wherein the quantity of fuel to be injected into the exhaust fluid upstream of the inlet for combustion in the diesel oxidation catalyst is injected into at least one cylinder of an engine to which the exhaust fluid treatment apparatus is attached in use.

7. The method of claim 6 wherein the injection of the fuel to be injected occurs when an exhaust valve of the cylinder is open.

8. An exhaust fluid treatment apparatus comprising a diesel oxidation catalyst and a controller, the diesel oxidation catalyst comprising an inlet and an outlet, the controller configured to:
   receive an input temperature data value being indicative of a temperature at the inlet;
   receive a flow rate data value being indicative of a rate of flow of fluid in the diesel oxidation catalyst;
   receive a threshold temperature data value indicative of a predicted temperature required for fuel in the diesel oxidation catalyst to oxidize;
   receive mode data indicative of whether the diesel oxidation catalyst is operating in a first mode or a second mode, the first mode being a warm-up mode and the second mode being a running mode of the diesel oxidation catalyst; and
   send, when the input temperature data value is greater than the threshold temperature data value, a fuel data value indicative of a quantity of fuel to be injected into the exhaust fluid upstream of the inlet for combustion in the diesel oxidation catalyst,
   wherein the fuel data value is obtained from a data library which comprises a first set of fuel data values relating to the first mode and a second set of fuel data values relating to the second mode, each fuel data value of the first and second sets of fuel data values being associated with a particular combination of input temperature data value and flow rate data value, and for each particular combination of input temperature data value and flow rate data value, a data value of the first set of data values is indicative of a smaller quantity of fuel or a slower rate of flow of fuel than a data value of the second set of data values.

9. The exhaust fluid treatment apparatus of claim 8 wherein the controller is part of an engine control unit which controls other aspects of engine performance.

10. An engine comprising the exhaust fuel treatment apparatus and the controller of claim 8.

11. The method of claim 1 wherein the input temperature data value indicative of a temperature at the inlet is obtained by receiving a temperature measurement upstream of the inlet and using a compensation factor to account for a likely change temperature change between the temperature measurement and the actual temperature at the inlet of the diesel oxidation catalyst.

12. The method of claim 1 wherein the flow rate data value is indicative of mass flow of exhaust or space velocity.

13. The method of claim 1 wherein the flow rate data value is obtained by a measurement in combination with a prediction.

14. The method of claim 1 wherein the step of receiving the flow rate data value comprises receiving an upstream pressure value of fluid upstream of the DOC, and receiving a downstream temperature value and a downstream pressure value of fluid downstream of the DOC, then consulting a look up table to identify an estimate of the flow rate data corresponding to the received upstream temperature value, the received upstream pressure value, the received downstream temperature value and the received downstream pressure value.

15. The method of claim 1 wherein the quantity of fuel to be injected into the exhaust fluid upstream of the inlet for combustion in the diesel oxidation catalyst is injected into at least one cylinder of an engine to which the exhaust fluid treatment apparatus is attached in use.

16. The method of claim 2 wherein the flow rate data value is obtained by a measurement in combination with a prediction.

17. The method of claim 2 wherein the step of receiving the flow rate data value comprises receiving an upstream pressure value of fluid upstream of the DOC, and receiving a downstream temperature value and a downstream pressure value of fluid downstream of the DOC, then consulting a look up table to identify an estimate of the flow rate data corresponding to the received upstream temperature value, the received upstream pressure value, the received downstream temperature value and the received downstream pressure value.

18. The method of claim 2 wherein the quantity of fuel to be injected into the exhaust fluid upstream of the inlet for combustion in the diesel oxidation catalyst is injected into at least one cylinder of an engine to which the exhaust fluid treatment apparatus is attached in use.

\* \* \* \* \*

UNITED STATES PATENT AND TRADEMARK OFFICE
CERTIFICATE OF CORRECTION

| | | |
|---|---|---|
| PATENT NO. | : 9,523,974 B2 | Page 1 of 1 |
| APPLICATION NO. | : 14/415910 | |
| DATED | : December 20, 2016 | |
| INVENTOR(S) | : Antony Eager | |

It is certified that error appears in the above-identified patent and that said Letters Patent is hereby corrected as shown below:

In the Specification

Column 1, Line 4, below 'Title' insert -- CROSS-REFERENCE TO RELATED APPLICATIONS This application is a U.S. National Phase of International Patent Application No. PCT/GB2013/051977 filed, July 24, 2013, which claims benefit of priority of British Patent Application No. 1213461.5 filed, July 27, 2012, all of which are incorporated herein by reference. --.

Signed and Sealed this
Fourteenth Day of March, 2017

Michelle K. Lee
*Director of the United States Patent and Trademark Office*